3,206,402
STABILISATION OF ORGANIC MATERIALS
Stuart Walter Critchley, Hale Barns, and Donald Richard Randell, Chaddesden, Derby, England, assignors to Geigy Chemical Corporation, Greenburgh, N.Y., a corporation of Delaware
No Drawing. Filed Mar. 28, 1963, Ser. No. 268,578
Claims priority, application Great Britain, Apr. 6, 1962, 13,444/62
7 Claims. (Cl. 252—47.5)

The present invention relates to a process for stabilising organic substances that are normally susceptible to oxygen or to oxidative deterioration. More particularly, it concerns the compositions of matter containing these substances and certain antioxidants more closely defined below.

When formulating lubricating oil compositions and, in particular, the synthetic oils that are used as lubricants for turbo-propeller and turbo-jet engines, it is customary to add to the compositions a conventional antioxidant such as phenothiazine or N-phenyl-1-naphthylamine. The fact that modern aero gas turbines, notably those employed to power supersonic aircraft, may necessitate operation for long periods with bulk oil temperatures considerably higher than 200° C., presents especial difficulty since a marked tendency exists for such synthetic lubricants to be defective in oxidative stability, despite the inclusion of conventional antioxidants. Moreover, a troublesome defect associated with the presence of antioxidants such as phenothiazine or N-phenyl-1-naphthylamine in aero gas turbine lubricants, when in service at high temperatures, is the gradual deposition of large amounts of sludge in the lubricants.

By contrast, it has surprisingly been found that formation of this objectionable sludge in such compositions can be diminished or even completely avoided on replacing such conventional antioxidants by a thiazepine compound of the general formula below.

According to the present inveniton compositions are provided comprising an oxidizable substance and a minor proportion of a thiazepine compound corresponding to the formula

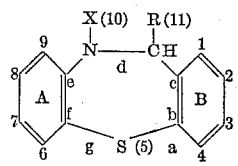

(I)

wherein

R represents hydrogen, or an aryl, particularly a phenyl radical, which is unsubstituted or substituted with halogen, especially bromine or chlorine, lower alkyl, lower alkoxy or hydroxyl;

X represents hydrogen; alkyl with 1 to maximally 8 carbon atoms, unsubstituted or substituted with halogen, especially with bromine, chlorine or fluorine, hydroxyl or lower alkoxy; phenyl, unsubstituted or substituted with halogen, especially bromine or chlorine, lower alkyl, lower alkoxy or hydroxyl; benzyl, phenylethyl, both either unsubstituted or substituted as defined further below; or acyl, especially lower alkanoyl such as acetyl or propionyl or benzoyl, and Each of the benzenoid rings A and B may be substituted by one or more halogen, especially chlorine and/or bromine atoms, or by lower alkyl, lower alkoxy, hydroxy, lower alkoxy-carbonyl, amino, mono-lower alkyl-amino or di-lower alkyl-amino radicals or may be condensed each with a further benzene ring.

The invention also relates to a method of rendering an oxidizable substance, especially of the classes defined further below, less susceptible to oxidative deterioration which comprises incorporating in said substance, as stabiliser, a minor proportion of a thiazepine compound of the above Formula I.

Preferably, X in Formula I represents hydrogen or alkyl with 1 to 8 carbon atoms, for example a straight-chain alkyl group such as the methyl or ethyl group, a branched-chain alkyl group, or a substituted alkyl group, e.g. hydroxyalkyl group such as the hydroxyethyl or 2-hydroxy group, a phenylmethyl or phenylethyl group, optionally ring-substituted with halogen, especially chlorine or bromine, or with lower alkyl or an acyl group as defined above.

Amongst the substances which may be rendered less susceptible to oxidative deterioration, according to this invention, may be mentioned hydrocarbons, mineral oils and waxes and synthetic lubricants; animal or vegetable oils, fats or waxes; ethers; aldehydes; natural and synthetic polymers of the "addition" and "condensation" class, such as the vinyl and vinylidene polymers and copolymers, especially those containing C=C double bonds and tertiary carbon atoms as, for example, rubbers, polyethylene and polypropylene and such polycondensates as, for example, those containing ester groupings and/or amide groupings and/or urethane groupings and the like.

There is thus a wide variety of materials which may be rendered less susceptible to oxidative deterioration according to this invention. More particularly, there are (1) Hydrocarbon petroleum products, e.g. gasoline, lubricating oils, mineral oils, waxes, etc;

(2) Rubber-type polymeric material including natural polymers e.g. rubber and synthetic polymers of the "addition" and "condensation" types. These include homopolymers and copolymers of vinyl and vinylidine monomers. Hydrocarbon addition polymers of ethylenically unsaturated monomers and/or those containing the C=C double bonds and tertiary carbon atoms are especially suitable. Examples of such hydrocarbon addition polymers are synthetic rubbers (polybutadiene), conventional high density polyethylenes and conventional isotactic polypropylenes. An illustrative of polymeric condensates, there are those that contain ester groupings and/or amide groupings and/or urethane groupings, e.g. conventional alkyd resins and polyamide resins, e.g. nylon, Rilsan and Perlon;

(3) Non-polymeric organic oxygen-containing substances such as aliphatic saturated aldehydes, e.g. oenanthal (heptanoic aldehyde) esters of monohydric and polyhydric, especially up to tetrahydric alkanols with unsaturated fatty acids, especially the unsaturated fatty acids, containing 10–20 carbon atoms, e.g. methyl oleate, and unsaturated fatty acids, especially those containing 10–20 carbon atoms, e.g. ricinoleic acid.

A particularly valuable aspect of the invention is the stabilisation of synehtic lubricating oils based on polyesters such as, for example, complex liquid esters, which are produced from a polyvalent, especially di- to tetrahydric alkanol, a saturated aliphatic or a carbocyclic, especially mononuclear aromatic mono- and especially di-carboxylic acid having no hydroxyl groups and a saturated higher aliphatic acid.

Among this valuable class of lubricants, there are especially the monocarboxylic fatty acid esters of trimethylol alkanes, e.g. trimethylolpropane tripelargonate as well as reaction products of one or more 2,2,4-trimethylol pentanol, neopentyl glycol, trimethylolpropane and penta- and dipentaerythritol and one or more pelargonic, propionic, n-heptanoic, caprylic, n-decanoic, sebacic, adipic and azelaic acids as produced by convention esterification analogous to the preparation of trimethylolpropane tripelargonate. A further valuable class of oxygen-containing organic substances are synthetic lubricating oils based on polyesters such as e.g. complex liquid esters which are products from polyvalent alcohols, and saturated aliphatic and/or aromatic discarboxylic acids having no hydroxy groups and saturated aliphatic and/or aromatic monocarboxylic acids having no hydroxy groups. These synthetic lubricating oils can be endowed with a substantially increased resistance to oxidation, especially at temperatures well in excess of 200° C. by the incorporation thereinto of a minor amount of at least one of the compounds of Formula I.

The liquid complex esters can be prepared by reacting in one or more stages (a) a saturated aliphatic non-hydroxylated monocarboxylic acid having from 1 to 18 carbon atoms or an aromatic non-hydroxylated monocarboxylated acid having from 7 to 15 carbon atoms or an aromatic non-hydroxylated monocarboxylic acid having from 7 to 15 carbon atoms or a mixture of same, (b) a saturated aliphatic polyhydric alcohol having from 5 to 15 carbon atoms and having the formula

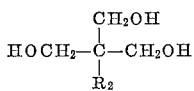

wherein $R_2$ is a member selected from the group consisting of an alkyl having from 2 to 4 carbon atoms and —$CH_2OR_3$ wherein $R_3$ is a member selected from the group consisting of hydrogen, aliphatic hydrocarbon containing 5 to 10 carbon atoms and oxygenated hydrocarbon containing 5 to 10 carbon atoms, and (c) a saturated aliphatic non-hydroxylated dicarboxylic acid having from 4 to 14 carbon atoms or an aromatic non-hydroxylated dicarboxylated acid having from 8 to 12 carbon atoms or a mixture of same, the relative proportion of (a), (b) and (c) being such that the viscosity of the ester so prepared is from 5 to 250 centistokes at 210° F.

Suitable monocarboxylic acids (a) are capric acid (decanoic acid), n-valeric acid (pentanoic acid), isovaleric acid (3-methylbutanoic acid), oenanthic acid (heptanoic acid), caprylic acid (octanoic acid), pelargonic acid (nonanoic acid), propionic acid (propanoic acid), and benzoic acid.

Suitable polyhydric alcohols (b) are 1:1:1-trimethylol propane, 2-methyl-2-n-proyl-1,3-propane diol, neopentyl glycol (2,2-dimethyl-1,3-propane diol), pentaerythritol, dipentaerythritol and tripentaerythritol.

Suitable dicarboxylic acids (c) are adipic acid, sebacic acid, azelaic acid and phthalic acid. Acids which form anhydrides may be used in that form e.g. phthalic anhydride.

The reaction may be carried out in the presence of an esterification catalyst such as p-toluene sulphonic acid, sodium bisulphate, potassium pyrosulphate, a tetra-alkyl titanate, titanium tetrachloride or a molecular sieve catalyst. Molecular sieves are naturally-occurring or synthetic zeolites which have the property or separating straight chain hydrocarbons from branched chain and cyclic hydrocarbons.

Merely to illustrate a preparation of said liquid complex esters, 2 mols of trimethylol propane, 12 mols of n-heptanoic acid and 1 mol of sebacic acid and about 50 mols of toluene as a water entrainer are heated under reflux in a flash fitted with a Dean and Stark water trap until water ceases to be evolved. After completion of the reaction, the product is washed with dilute aqueous sodium carbonate solution and dried. The toluene is removed by stripping under reduced pressure on a water bath and the refining of the product is completed by stripping to a temperature of 200° C. at 0.1–0.2 mm. of mercury. A similar liquid complex ester can be obtained by employing 10 molar proportions of caprylic acid, 4 molar proportions of trimethylol propane and 1 molar proportion of sebacic acid in place of the foregoing 2 mols of trimethylol propane, 12 mols of n-heptanoic acid and 1 mol of sebacic acid.

The above enumeration of organic materials susceptible to oxidative deterioration is not intended to be a limitation but merely serves to illustrate the wide applicability of the new antioxidants. Other organic compounds that can be readily stabilised are conventional synthetic lubricants, hydrocarbons such as tetraline, vitamins, essential oils, ketones and ethers.

The invention therefore includes lubricating oils especially the synthetic lubricating oils referred to above, and lubricating oil compositions, which have an increased resistance to oxidative degradation and formation of sludge comprising as sole antioxidant one or more of the thiazepine compounds defined above.

The stabilisers of Formula I used according to the invention are employed in effective amounts, i.e. in amounts of 0.001% to 5% by weight, calculated on the weight of the organic material to be stabilised; preferably they are used in amounts of 0.1% to 2%. The specific amount of stabiliser will depend not only on the compositions to be stabilised but on the conditions under which the compositions should be kept stable. Here external conditions come into play, e.g. when the compositions are to be kept stable at room temperature less antioxidant of Formula I is required than when the same compositions are to be kept stable at 200° F.

The stabilisers can be incorporated into the compositions to be stabilised in the conventional manner, e.g. manual mixing or mechanical mixing. The mode of preparation is not critical and will depend on the type of composition to be stabilised.

As indicated above, the optimal amounts of stabiliser to be used differ and depend, primarily, on the nature of the carrier material as well as on the conditions to which it is to be subjected. The figures provided in the examples herein give certain indications for individual carrier materials and antioxidants. Some of the antioxidants of the invention have a rather specific protective action.

Compared with the antioxidants previously used, those according to the invention, when employed in comparable amounts under the same conditions, often have a better and/or longer action.

Below are listed representative compounds which are useful when applied in accordance with the invention:

10:11-dihydrodibenzo(b,f)(1.4)thiazepine
8-methyl-10:11-dihydrodibenz(b,f)(1:4)thiazepine
8-chloro-10:11-dihydrodibenz(b,f)(1:4)thiazepine
13,14-dihydrodinaphtho[2,1-b,2′,3′-f](1.4)thiazepine
11-phenyl-10:11-dihydrodibenz(b,f)(1:4)thiazepine
10-ethyl-10:11-dihydrodibenz(b,f)(1:4)thiazepine
10-benzyl-10:11-dihydrodibenz(b,f)(1:4)thiazepine
10-acetyl-10:11-dihydrodibenz(b,f)(1:4)thiazepine
13:14-dihydrodinaphtho[2,3-b,2′,3′-f](1:4)thiazepine The compounds of Formula I are prepared by known methods described, for example, by Brodrick et al. in J. Chem. Soc. (1954), Part IV, p. 3857 and seq., in British Patents Nos. 696,473, published September 2, 1953, 802,-901 and 802,902, both published on October 15, 1958, and U.S. Patent 3,050,524, issued August 21, 1962.

In producing the compounds with fused bicyclic nuclei A and B, the corresponding 1-chloro-2-nitro- or 2-chloro-3-nitro-naphthalenes and 2-thio-naphthalenes are used in lieu of the corresponding benzenes described by Brodrick et al., and in U.S. Patent 3,050,524, supra.

The following examples serve to illustrate the invention without limiting it thereto. Where not otherwise expressly stated, the parts are by weight; their relationship to parts by volume is as that of grams to milliliters. The temperatures are in degrees centigrade.

EXAMPLE 1

Using trimethylolpropane tripelargonate as a base oil for synthetic lubricants of high thermal stability, the following data were determined.

These tests demonstrate the effectiveness of the antioxidants of this invention, with particular reference to their capacity to minimize sludge deposition in the lubricant medium, while simultaneously limiting the extent of viscosity increase indicative of oxidative deterioration in the oil.

The oxidation test consisted in heating a 100 ml. sample of the oil containing the antioxidant at 260° C. (500° F.) for a period of 6 hours, whilst aspirating dry air therethrough at a rate of 5 litres per hour. Two steel specimens were immersed in the liquid throughout the test to determine the degree of attack thereon. To provide a comparison, results are included in the table, using the base oil without the addition of any antioxidant and also when treated under the test conditions with well-known antioxidants.

| Additive | Weight percent | Percent viscosity increase at 100° F. | Deposited sludge (mg.) |
|---|---|---|---|
| None | | 31.7 | 16 |
| N-phenyl-1-naphthylamine | 1.0 | 9.2 | 274 |
| Phenothiazine | 1.0 | 12.9 | 617 |
| 10:11-dihydrodibenzo(b,f)(1:4)-thiazepine | 1.0 | 16.6 | 18 |
| 8-chloro-10:11-dihydrodibenzo(b,f)(1:4) thiazepine | 1.0 | 8.2 | 18 |
| 11-phenyl-10:11-dihydrodibenzo(b,f)(1:4)-thiazepine | 1.0 | 12.9 | 47 |

EXAMPLE 2

A polyester of high thermal stability was made by reacting 10 molar proportions of caprylic acid, 4 molar proportions of trimethylol propane and 1 molar proportion of sebacic acid in a single step and in the absence of a catalyst. This product was blended with 4% by weight trimethylol tricaprylate.

A. The testing procedure described in Example 1 was followed, except that the 100 ml. sample of polyester was heated for 6 hours at 260° C. whilst aspirating dry air therethrough at a rate of 12 litres per hour.

The results given in the table below show impressively the capacity of an antioxidant within the scope of this invention to suppress sludge formation in the synthetic lubricant under test, as compared with conventional antioxidants.

| Additive | Weight percent | Percent viscosity increase at 100° F. | Deposited sludge (mg.) |
|---|---|---|---|
| None | | 113 | 0 |
| N-phenyl-1-naphthylamine | 2.0 | 48 | 250 |
| Phenothiazine | 2.0 | 35 | 285 |
| 10:11-dihydrodibenzo(b,f)(1:4)-thiazepine | 2.0 | 47 | 2 |

B. The testing procedure described in Example 1 was again followed, save that the 100 ml. sample of polyester was heated for 30 hours at 220° C., whilst aspirating dry air therethrough at a rate of 15 litres per hour. In this case also, the results obtained serve to demonstrate the remarkable sludge suppression characteristics which can be displayed by the antioxidants of this invention.

| Additive | Weight percent | Percent viscosity increase at 100° F. | Deposited sludge (mg.) |
|---|---|---|---|
| None | | 4,320 | 0 |
| N-phenyl-1-naphthylamine | 2.0 | 35 | 53 |
| Phenothiazine | 2.0 | 46 | 275 |
| 10:11-dihydrodibenzo(b,f)(1:4) thiazepine | 2.0 | 42 | 0 |

EXAMPLE 3

*Stabilisation of a polyvinyl chloride composition*

A composition was compounded on a two-roll mill from:

100 parts of a vinyl chloride granular polymer having a K-value of 65
65 parts of di(tridecyl)phthalate
2 parts of a co-precipitated barium/cadmium laurate heat stabiliser and neutralising agent sold under the trade name "Ferroclere 1820"
1 part of a fluidised epoxy resin of low viscosity sold under the trade name "Ferroclere 900"
0.3 part of the thiazepine antioxidant under test (0.17 percent)

The composition was subsequently compression-moulded into sheets (15 cm. x 1 cm. x approx. 15/1000 cm. thickness).

Fifteen specimens of each preparation were suspended in an air circulation oven at 150° C., three specimens of each being removed every two days and the average percentage weight loss determined. This loss in weight is taken to be a measure of oxidative deterioration and the specified thiazepine derivatives were tested against a control.

It will be seen from the following table that, by comparison with the control specimen, which contained no antioxidant, the compositions which contained a thiazepine derivative showed a noticeable decrease in weight loss.

| Additive | Percent weight loss after— | | | | |
|---|---|---|---|---|---|
| | 48 hrs. | 96 hrs. | 144 hrs. | 192 hrs. | 240 hrs. |
| None | 11.26 | 17.45 | 23.11 | 33.45 | 39.38 |
| 10:11-dihydrodibenzo(b,f)(1:4)thiazepine | 8.54 | 14.47 | 20.35 | 25.91 | 31.45 |
| 8-chloro-10:11-di-hydrodibenzo(b,f)(1:4) thiazepine | 8.32 | 13.75 | 20.2 | 25.91 | 31.45 |

EXAMPLE 4

A synthetic lubricant polyester prepared from sebacic acid (1 mol), trimethylol propane (10 mols) and caprylic acid (28 mols) was used as a test fluid in evaluating an antioxidant in accordance with this invention. The oil has a viscosity of 5 cs., measured at 210° F. Air was blown at the rate of 5 litres per minute through the oil at a temperature of 450° F. for 48 hours, in the presence of metal specimens consisting of magnesium, aluminium, copper, silver and iron and comparative tests were made, using (i) the untreated oil as a control, (ii) a synergistic antioxidant comprising equal weights of N-phenyl-α-naphthylamine and 5-ethyl-10:10-diphenylphenazasilane;

(iii) 10:11 - dihydro - dibenzo(b,f)(1:4)thiazepine. The results are summarized in the table below:

| Additive | Percent weight | Percent visc. inc. | Acid value increase, mg./sq. cm. | Sludge in mg. | Weight change of specimens (mg./sq. cm.) | | | | |
|---|---|---|---|---|---|---|---|---|---|
| | | | | | Mg. | Al | Cu | Ag | Fe |
| None | | 404 | 17.75 | 1200 | −71.34 | +0.09 | +0.05 | +0.08 | −4.00 |
| N-phenyl-α-naphthylamine 5-ethyl-10:10 diphenylphen-azasilane | 1.0 1.0 | 340 | 4.95 | 800 | −8.34 | −0.05 | −1.32 | −0.08 | −0.06 |
| 10:11-dihydrodibenzo(b,f) (1:4)thiazepine | 2.0 | 88 | 5.50 | 770 | −0.17 | +0.05 | −0.01 | −0.01 | +0.06 |

It will be seen that the thiazepine antioxidant was most effective in inhibiting corrosion of all the metal specimens and that it was likewise instrumental in restraining increase in viscosity and acid value.

What is claimed is:

1. A composition stable against oxidative deterioration consisting essentially of an organic substance sensitive to oxidation and selected from the group consisting of lubricating oils and synthetic polymeric materials, and a sufficient amount of a compound of the formula

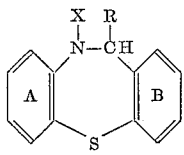

wherein

R is a member selected from the group consisting of hydrogen, phenyl, bromophenyl, chlorophenyl, lower alkoxyphenyl and hydroxyphenyl, X is a member selected from the group consisting of hydrogen, alkyl with from 1 to 8 carbon atoms, benzyl, and lower alkanoyl, and each of the benzenoid rings A and B is a ring consisting of an unsubstituted, a chloro-substituted, a bromo-substituted, a lower-alkyl substituted, and a ring fused with another benzene ring, to effectively protect said organic substance against oxidative deterioration.

2. A composition as defined in claim 1, wherein the amount of the compound of said formula added to said organic substance is from about 0.001% to 5% by weight, calculated on the weight of the latter substance.

3. A composition stable against oxidative deterioration which consists essentially of (I) trimethylolpropane tripelargonate and, from about 0.001% to 5% by weight, of
(II) 8-chloro - 10:11-dihydrodibenzo(b,f)(1:4)thiazepine, calculated on the weight of substance I.

4. A composition stable against oxidative deterioration which consists essentially of (I) a lubricating oil which is an ester of a di- to trihydric alkanol with a saturated aliphatic hydrocarbon dicarboxylic acid and, from about 0.001% to 5% by weight, of
(II) 8-chloro - 10:11-dihydrodibenzo(b,f)(1:4)thiazepine, calculated on the weight of substance I.

5. A composition of high thermal stability to oxidative deterioration consisting essentially of a lubricating oil which is a polyester of trimethylolpropane with caprylic and sebacic acid and of about 0.001% to 5% by weight, calculated on the weight of said ester, of 10:11-dihydrobenzo(b,f)(1:4)thiazepine.

6. A composition stable against oxidative deterioration, consisting essentially of (I) a mixture of vinylchloride polymer and di-tridecylphthalate and
(II) from 0.01 to 5% of 10:11-dihydrodibenzo(b,f)(1:4)thiazepine, calculated on the weight of (I).

7. A composition stable against oxidative deterioration, consisting essentially of (I) a mixture of vinylchloride polymer and di-tridecylphthalate, and
(II) from 0.01 to 5% of 8-cholro-10:11-dihydrodibenzo(b,f)(1:4)thiazepine, calculated on the weight of (I).

References Cited by the Examiner

UNITED STATES PATENTS

| 1,940,816 | 12/33 | Semon | 260—800 |
| 2,227,908 | 1/41 | Lewis | 252—47 |
| 2,587,660 | 3/52 | Smith | 252—47.5 |
| 2,587,661 | 3/52 | Smith | 252—402 |
| 2,694,705 | 11/54 | Cusic | 252—402 |
| 3,014,888 | 12/61 | Shimmin et al. | 252—47 |
| 3,029,234 | 4/62 | Luvisi | 252—402 |
| 3,050,524 | 8/62 | Yale et al. | 260—293.4 |

DANIEL E. WYMAN, *Primary Examiner.*